(12) United States Patent
Witte et al.

(10) Patent No.: US 10,245,793 B2
(45) Date of Patent: Apr. 2, 2019

(54) METHOD AND AN APPARATUS FOR FORMING PROFILE ELEMENTS

(71) Applicant: Airbus Operations GmbH, Hamburg (DE)

(72) Inventors: Tassilo Witte, Hamburg (DE); Hannes Winter, Rostock (DE)

(73) Assignee: Airbus Operations GmbH, Hamburg (DE)

( * ) Notice: Subject to any disclaimer, the term of this patent is extended or adjusted under 35 U.S.C. 154(b) by 356 days.

(21) Appl. No.: 14/825,338

(22) Filed: Aug. 13, 2015

(65) Prior Publication Data

US 2016/0046083 A1 Feb. 18, 2016

(30) Foreign Application Priority Data

Aug. 14, 2014 (EP) ..................................... 14180923

(51) Int. Cl.
*B29C 70/50* (2006.01)
*B29D 99/00* (2010.01)
(Continued)

(52) U.S. Cl.
CPC .......... *B29C 70/506* (2013.01); *B29C 53/043* (2013.01); *B29C 70/222* (2013.01); *B29C 70/504* (2013.01); *B29D 99/0003* (2013.01); *B65H 3/04* (2013.01); *B65H 5/023* (2013.01); *B65H 5/224* (2013.01);
(Continued)

(58) Field of Classification Search
CPC ... B29C 70/504; B29C 70/506; B29C 53/043; B29C 70/222; B29D 99/0003; B65H 3/04; B65H 5/023; B65H 5/224
See application file for complete search history.

(56) References Cited

U.S. PATENT DOCUMENTS

2005/0023728 A1* 2/2005 Benson ................. B29C 70/388
264/258
2010/0012260 A1* 1/2010 Brennan ................. B29C 70/30
156/196

FOREIGN PATENT DOCUMENTS

BE 664 896 A 10/1965
CN 101959673 A 1/2011
(Continued)

OTHER PUBLICATIONS

"Conveyors Explained", Conveyor Units, Jul. 8, 2013, accessed at www.conveyor-units.co.uk/conveyors-explained/ on Nov. 13, 2017. (Year: 2013).*
(Continued)

*Primary Examiner* — Anthony Calandra
*Assistant Examiner* — Jamel M Nelson
(74) *Attorney, Agent, or Firm* — Jenkins, Wilson, Taylor & Hunt, P.A.

(57) ABSTRACT

For forming profile elements, in particular trapezoidal or Ω-shaped profile elements, from a multilayer stacking of pre-impregnated fibers, the stacking is moved in feed direction with feed speed by sets of conveyor belts which engage with the upper and lower surfaces of the lateral edge sections of the stacking and hold the edge sections in a starting plane. The sets of conveyor belts are arranged so that the distance between the sets engaging with opposite edge sections decreases in feed direction. To conduct the forming step a middle portion of the stacking is moved over a ramp upwardly inclined in feed direction with respect to the starting plane.

19 Claims, 3 Drawing Sheets

(51) Int. Cl.
  *B29C 70/22*   (2006.01)
  *B29C 53/04*   (2006.01)
  *B65H 3/04*    (2006.01)
  *B65H 5/02*    (2006.01)
  *B65H 5/22*    (2006.01)
  *B29K 105/08*  (2006.01)
  *B29K 105/00*  (2006.01)
  *B29K 307/04*  (2006.01)

(52) U.S. Cl.
  CPC .............. *B29K 2105/0872* (2013.01); *B29K 2105/256* (2013.01); *B29K 2307/04* (2013.01); *B65H 2406/32* (2013.01); *Y02T 50/43* (2013.01)

(56) References Cited

FOREIGN PATENT DOCUMENTS

| | | |
|---|---|---|
| CN | 102006986 A | 4/2011 |
| CN | 102574334 A | 7/2012 |
| EP | 2 805 802 A1 | 11/2014 |
| EP | 2 985 137 B2 | 10/2017 |
| WO | WO 2009/097514 A1 | 8/2009 |

OTHER PUBLICATIONS

European Search Report for Application No. 14 180923.6 dated Jan. 28, 2015.
Chinese Office Action for Chinese Application No. 201510500940.1 dated Feb. 22, 2017.

\* cited by examiner

METHOD AND AN APPARATUS FOR FORMING PROFILE ELEMENTS

CROSS-REFERENCE TO RELATED APPLICATION

This application claims priority to European Patent Application No. 14180923.6 filed Aug. 14, 2014, the entire disclosure of which is incorporated by reference herein.

TECHNICAL FIELD

The disclosure herein relates to a method and an apparatus for forming profile elements, in particular trapezoidal, Ω-shaped, semi-circular (gauβ-wave-form) or hat-shaped profile elements, from a multilayer stacking of pre-impregnated fibers, so-called prepregs.

Such "prepregs" may comprise fibers impregnated with a thermoplastic or thermosetting resin and may in addition comprise layers of such resin wherein the fibers may consist of carbon, glass, aramid or the like.

BACKGROUND

Profile elements, in particular those made of carbon fiber reinforced material, are used in production of aircraft. To manufacture such profile elements, it is known to place an element pre-cut from a stacking of a plurality of layers of pre-impregnated fibers and usually preheated into a mold and press this element into a mold cavity to form the profile element with the cross-section required. After curing of thermosetting or thermoplastic resin used to impregnate the fibers the profile element and removing the element from the mold is ready for use. However, such a discontinuous process of manufacturing is time-consuming and, in addition, the profile element produced might be somewhat defective. The reason therefore is to be seen in that the layers of the stacking do have all the same lengths perpendicular to the longitudinal direction of the stacking and need to slide with respect to each other when the material is deformed. However, in many cases the edges in the mold and the engagement of the mold elements in these edge areas with the stacking material prevent such sliding so that within the material wrinkles develop which reduce the quality of the material.

In earlier European Patent Application No. 13168504-2 (Assignee: Airbus Operations GmbH), filed on May 21, 2013, the contents of which are incorporated by reference herein, a method for continuously producing essentially Ω-shaped profile elements from a multi-layer stacking of pre-impregnated fibers is described, wherein at the beginning of the process the stacking is produced and then such continuous stacking is fed through several processing stations, like a heating station, a pre-forming station, a further heating station and then through a forming station. This forming station comprises a wheel with a mold recess in its outer circumference and further comprises a plurality of forming elements arranged adjacent to the wheel to press parts of the pre-formed stacking, successively into the mold recess. At the end of this forming process a predetermined length of the formed material is cut off.

SUMMARY

It is an object of the disclosure herein to provide for a method for continuously forming profile elements of the type of interest.

According to the disclosure herein, this object is achieved by moving a multi-layer stacking of pre-impregnated fibers, preferably carbon fibers, in a feed direction with feed speed by sets of conveyor belts which engage with the upper and lower surfaces of the lateral edge sections of the stacking and hold the edge sections in a starting plane and which are arranged so that the distance between such sets of conveyor belts engaging with opposite edge sections decreases in feed direction, and by moving a middle portion of the stacking over a ramp upwardly inclined in feed direction with the respect to the starting plane.

In such a method the continuous stacking which can either be pulled off a supply wheel or can be produced from separate layers at the beginning of the process and which may be pre-heated prior to starting the forming step, is deformed gradually by moving the middle portion of the stacking over an upwardly inclined ramp, while the edge sections of such stacking are held in a starting plane and move in feeding direction by sets of conveyor belts. Preferably, the average angle of inclination of the ramp amounts to approximately 10°. Thereby, a gradual deformation takes place and the clamping between the sets of conveyor belts is sufficient to move the stacking in feeding direction across the ramp, but does not prevent sliding of stacking layers with respect to each other during the forming process so that the above-described wrinkling is avoided.

Preferably, the ramp is formed by a central conveyor belt having its belt moving with feed speed so that this conveyor belt assists feeding of the stacking.

To ensure that the middle portion of the stacking is formed to a plane wall section, the middle portion may be held in engagement with the ramp by an arrangement of idle rollers or a conveyor belt engaging with the upper surface of the middle portion. In addition, a vacuum may be applied to the lower side of the middle portion to assist the holding in engagement thereof with the ramp.

After leaving the ramp, the middle portion including the lateral walls formed may be placed on a support mandrel or may then be cut to lengths.

An apparatus for carrying out the method according to the disclosure herein comprises two sets of conveyor belts, each set comprising two cooperating conveyor belts having their cooperating belt sections located in parallel to the starting plane, wherein the sets are spaced from each other to commonly advance a stacking of material in feed direction by engagement with the lateral edge sections thereof, wherein the distance between the sets of belt sections decreases in the feed direction, and wherein a ramp is located between the sets of conveyor belts and is upwardly inclined in feed direction. Preferably, the ramp is formed by a conveyor belt having its upper belt section moving in feeding direction.

To support and guide the inclined walls of the material generated during the forming process inclined lateral guide surfaces may extend from the lateral ends of the ramp in direction to the inner rims of the cooperating belt sections of the sets of conveyor belts.

To hold the middle portion of the stacking in engagement with the ramp, above such ramp an arrangement of idle rollers or a conveyor belt may be provided may be arranged for engaging with the upper surface of the middle portion of the material.

Holding the middle portion in engagement with the ramp may be further assisted by applying a vacuum to the middle portion of the material in the area of the ramp.

Behind the ramp a support mandrel for supporting the formed profile may be provided. Further, a cutting device for cross-cutting the material formed may be located behind the upper end of the ramp.

BRIEF DESCRIPTION OF THE DRAWINGS

In the following, the disclosure herein will be explained in more detail with reference to the accompanying sketches which show in principle parts of an apparatus of interest wherein the different sketches are not necessarily illustrated to scale and the different sketches show parts of different portions to facilitate understanding of the disclosure herein rather than disclosing assembly of these parts to a complete machine.

DETAILED DESCRIPTION

Figure 1:
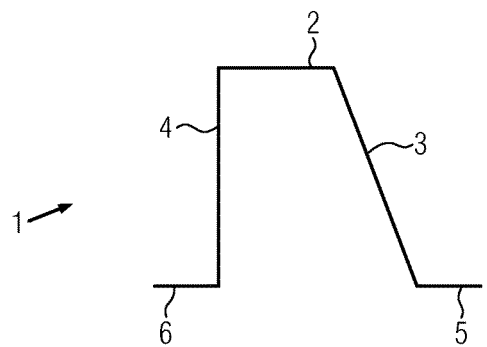
FIG. 1 shows in a cross-sectional view the shape of a profile element which may be produced by the disclosure herein.

FIG. 1 shows a cross-section through a profile element 1 which can be manufactured by the disclosure herein. As can be seen, the profile element comprises a flat base 2 and lateral walls 3, 4 from which flanges 5, 6 extend outwardly and are located in a common plane. The profile is somewhat asymmetrical in cross-section, since the lateral wall 3 is more inclined with respect to the flanges 5, 6, e.g. by 95° to 110° with respect to flange 5 than lateral wall 4. The edges formed by the base 2 and both lateral wall 3 and lateral wall 4 may have a slight radius of curvature of about 3 mm to 7 mm.

It should be noted that by the disclosure herein differently shaped profiles can be formed, e.g. with a similar but symmetrical cross-section as shown in FIG. 1. In both cases such essentially Ω-shaped profile elements may be converted to trapezoidal profile elements by cutting off flanges 5, 6. Further, hat-shaped profile elements may be formed as well, and Z-shaped element can be obtained by longitudinally cutting an Ω- or hat-shaped profile element.

Figure 2:
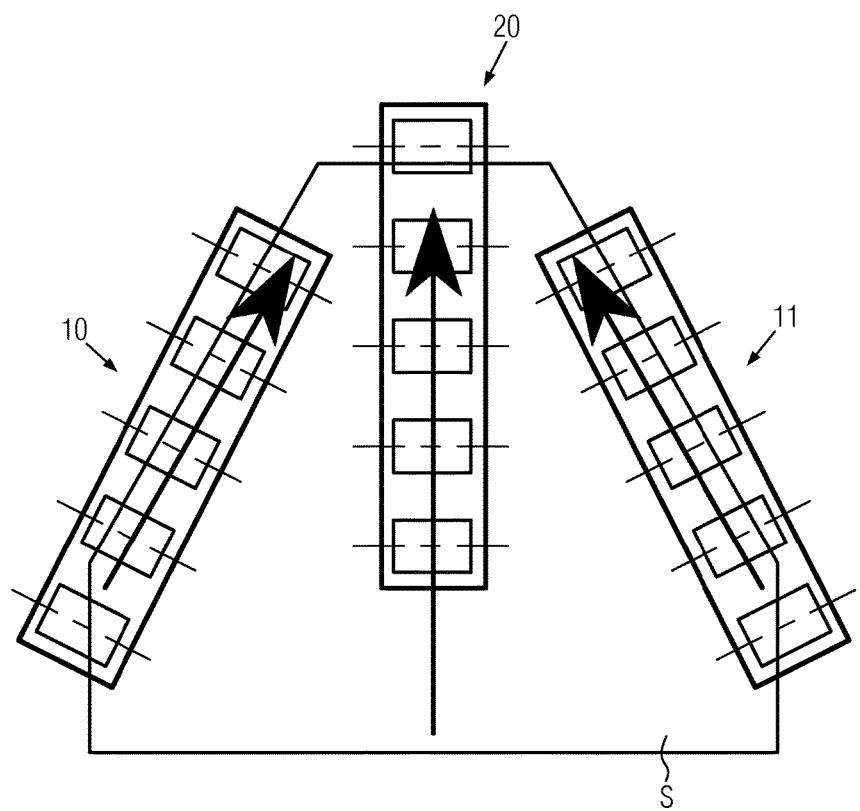
FIG. 2 shows in a schematic view from above the arrangement of the lateral sets of conveyor belts and a central conveyor belt in an apparatus according to the disclosure herein with the stacking to be deformed indicated.
Figure 3:
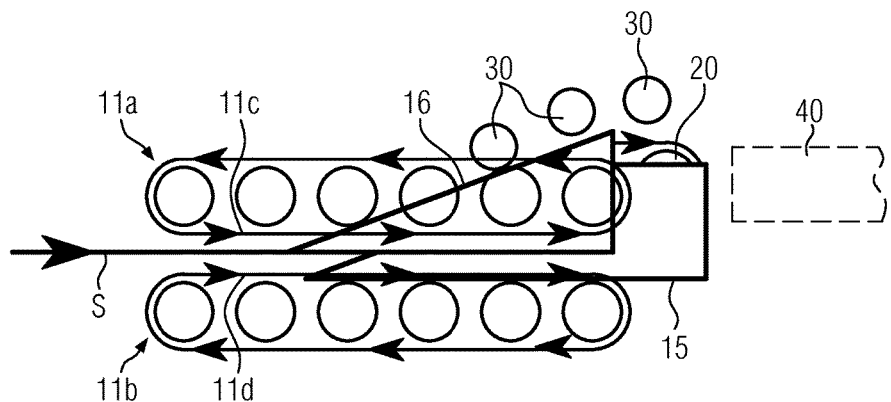
FIG. 3 shows in a schematic lateral side view of conveyor belts in the apparatus according to the disclosure herein together with other elements thereof.
Figure 4A:
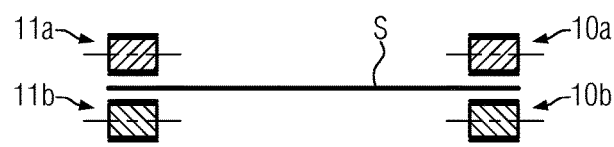
FIG. 4A shows in principle the still plane material stacking to be deformed and held between the lateral sets of conveyor belts.

As illustrated in FIGS. 2 and 3, the apparatus according to the disclosure herein comprises two sets of conveyor belts 10, 11, each comprising an upper conveyor belt 10a, 11a and a lower conveyor belt 10b, 11b. Their cooperating belt sections (11c, 11d in FIG. 3) are arranged to engage with the lateral edge sections of a stacking S of a plurality of layers of pre-impregnated fibers which stacking, as mentioned above, may be preheated for conducting the forming step. As shown in FIG. 2, the sets of conveyor belts 10, 11 are arranged so that the distance between them decreases in feed direction (indicated by arrows) of the stacking S so that through the entire forming step the cooperating sections 11c, 11d (FIG. 3) of both sets of conveyor belts 10, 11 stay in engagement with the lateral rims of the stacking to finally form the flanges 5, 6 (FIG. 1) which may have a width of e. g. 2 cm to 3 cm. During the entire forming step the edge sections are held in a starting plane defined by the cooperating belt sections 11c, 11d (FIG. 3) which starting plane is also represented by the position of stacking S in FIG. 4A.

Between the sets of conveyor belts 10, 11 a central conveyor belt 20 is provided which forms a ramp upwardly inclined in feed direction. The conveyor belt 20 is supported on a ramp body 16 held in a schematically indicated machine frame 15 (FIG. 3). The average angle of inclination of the ramp amounts to approximately 10°.

Figure 4B:
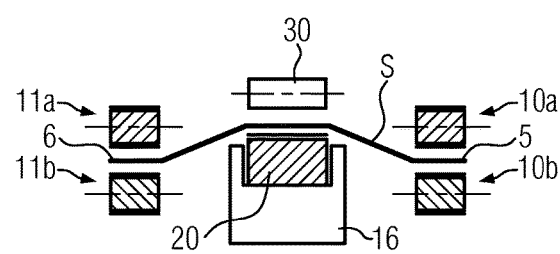
FIG. 4B shows in a schematic view corresponding to FIG. 4A the material stacking transported by the lateral sets of conveyor belts and partially deformed by the upwardly inclined ramp.
Figure 4C:
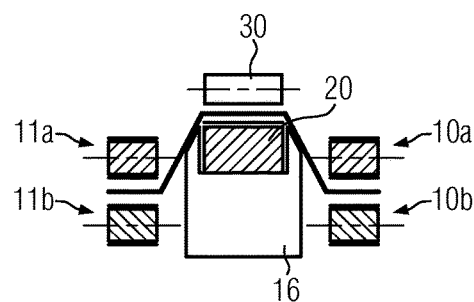
FIG. 4C shows in a view corresponding to FIG. 4B the stacking at a point farther upward on the ramp.
Figure 6:
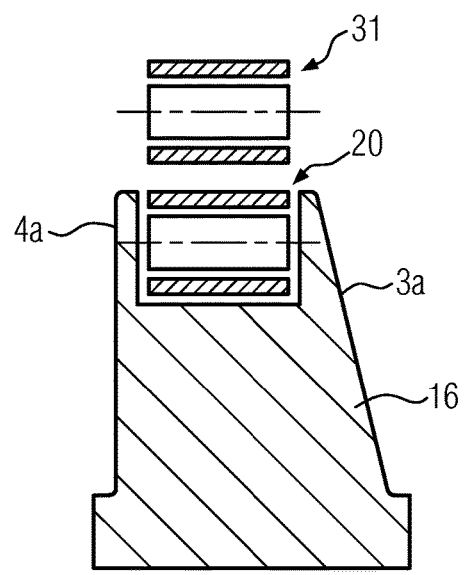
FIG. 6 shows a sectional view of the arrangement of FIG. 5.

When the stacking S is engaged by the conveyors 10a, 10b and 11a, 11b (FIG. 4A) of the sets of conveyor belts 10, 11 and is then moved in feed direction, the stacking engages with the central conveyor belt 20 that also moves in feed direction and assists corresponding displacement of the stacking S, as indicated in FIGS. 4B and 4C. During this displacement the originally plane stacking S, is gradually formed to a profile as indicated e.g. in FIG. 1, wherein the inclination of the lateral walls 3, 4 is defined by correspondingly inclined lateral guide surfaces 3a, 4a of ramp body 16 (FIG. 6 and also indicated in FIG. 4C). These guide surfaces extend downwardly from the upper ends of the wall sections forming a recess for receiving the conveyor belt 20, as indicated in FIG. 6, and which also form lateral parts of the upwardly inclined ramp. The transition areas between the upper ends of the wall sections and the lateral guide surfaces 3A, 4A are slightly curved to form correspondingly curved edges in the profile element.

In FIG. 3 and FIGS. 4B and 4C a plurality of idle rollers 30 are indicated which are located slightly above the ramp formed by the central conveyor belt 20 so that in operation these idle rollers engage with the central portion of the stacking S which central portion later on forms base 2 of the profile element (FIG. 1). Thereby, it is ensured that the stacking portion is held in engagement with the inclined ramp.

Figure 5:
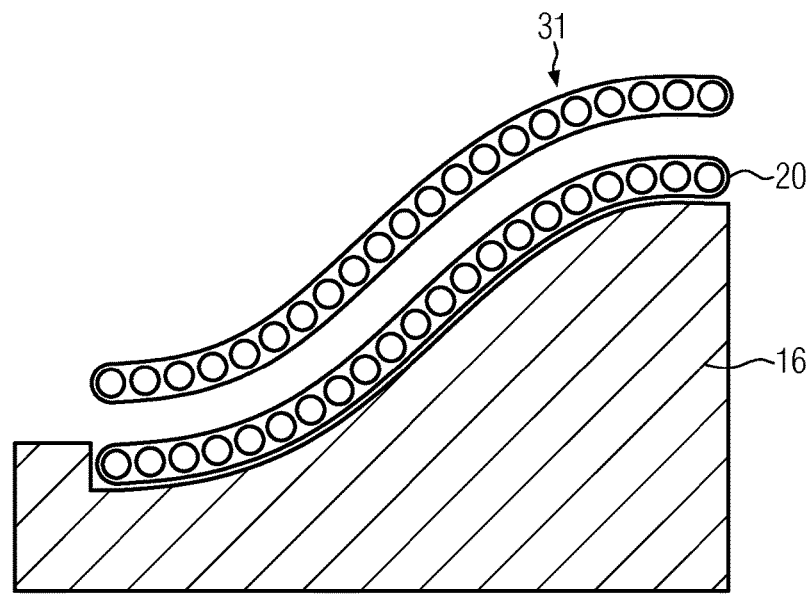
FIG. 5 shows a schematic sectional view through the upwardly inclined ramp formed by a conveyor belt.

In the arrangement shown in FIGS. 5 and 6 a conveyor belt 31 is located above the central conveyor belt 20 and in operation is driven with the same speed as the conveyor belt 20. The conveyor belt 31 cooperates with the conveyor belt 20 to maintain the central portion of the stacking S in engagement with the conveyor belt 20.

Further, the ramp body 16 may comprise devices or structures such nozzles which are connected to a vacuum source so that a vacuum may be applied to the lower side of the middle portion of the stacking S so as to keep it in engagement with the conveyor belt 20.

Upon completion of the forming step the stacking S formed leaves the central conveyor belt 20 and is received by a further forming section comprising e.g. a support mandrel 40 shown in principle in FIG. 13. This support mandrel 40 supports the base, the lateral walls and the flanges of the deformed stacking generated. However, it is also conceivable that the deformed stacking may be cut to length by a cutting device.

After curing of thermoplastic or thermosetting resin used for impregnating the fibers of the stacking material the profile elements are ready for use.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for forming profile elements from a multilayer stack of pre-impregnated fibers, the method comprising:
    moving the multilayer stack in a feed direction at a feed speed by a first set of conveyor belts and a second set of conveyor belts, wherein the first set of conveyor belts engage with an upper surface and a lower surface of a first lateral edge section of the multilayer stack, wherein the second set of conveyor belts engage with an upper surface and a lower surface of a second lateral edge section of the multilayer stack, wherein the second lateral edge section is opposite to the first lateral edge section, wherein the first and second sets of conveyor belts hold the first and second lateral edge sections in a starting plane, and wherein the first and second sets of conveyor belts are arranged so that a distance between the first and second sets of conveyor belts decreases in the feed direction; and
    moving a middle portion of the multilayer stack over a ramp upwardly inclined in the feed direction with respect to the starting plane.

2. The method according to claim 1, comprising forming trapezoidal, Ω-shaped, semi-circular (gauβ-wave-form), or hat-shaped profile elements.

3. The method according to claim 1, wherein the ramp is formed by a central conveyor belt, a respective belt of the central conveyor belt moving at the feed speed.

4. The method according to claim 1, wherein the middle portion of the multilayer stack is held in engagement with the ramp by an arrangement of idle rollers engaging with an upper surface of the middle portion.

5. The method according to claim 1, wherein the middle portion of the multilayer stack is held in engagement with the ramp by a conveyor belt which engages with an upper surface of the middle portion.

6. The method according to claim 1, comprising applying a vacuum to a lower side of the middle portion of the multilayer stack.

7. The method according to claim 1, comprising, after leaving the ramp, placing the middle portion of the multilayer stack, including lateral walls formed, on a support member.

8. The method according to claim 1, wherein the first and second sets of conveyor belts are arranged in a shape of a V.

9. The method according to claim 1, wherein the distance between the first and second sets of conveyor belts that decreases in the feed direction is measured in a direction orthogonal to the feed direction, such that the distance between the first and second sets of conveyor belts decreases as the multilayer stack moves in the feed direction.

10. An apparatus for forming profile elements from a multilayer stack of pre-impregnated fibers, the apparatus comprising:
    a first set of conveyor belts;
    a second set of conveyor belts;
        wherein each of the first and second sets of conveyor belts comprise two cooperating conveyor belts having respective cooperating belt sections thereof located in parallel to a starting plane,
        wherein the first and second sets of conveyor belts are spaced from each other to commonly advance a stack of material in a feed direction by:
            engagement of the first set of conveyor belts with a first lateral edge section of the stack of material; and
            engagement of the second set of conveyor belts with a second lateral edge section of the stack of material;
        wherein a distance between the first and second sets of conveyor belts decreases in the feed direction; and
    a ramp located between the first and second sets of conveyor belts, wherein the ramp is upwardly inclined in the feed direction.

11. The apparatus according to claim 10, comprising inclined lateral guide surfaces extending from lateral ends of the ramp in a direction to inner rims of the two cooperating belt sections of the first and second sets of conveyor belts.

12. The apparatus according to claim 10, wherein the ramp comprises a conveyor belt having an upper belt section moving in the feed direction.

13. The apparatus according to claim 10, comprising, above the ramp, an arrangement of idle rollers for engaging with an upper surface of a middle portion of the stack of material.

14. The apparatus according to claim 10, comprising, above the ramp, a conveyor belt for engagement with an upper surface of a middle portion of the stack of material.

15. The apparatus according to claim 10, comprising a vacuum apparatus for applying a vacuum to a middle portion of the stack of material in an area of the ramp.

16. The apparatus according to claim 10, comprising a support member for supporting the formed profile, wherein the support member is behind the ramp.

17. The apparatus according to claim 10, wherein the profile elements comprise trapezoidal, Ω-shaped, semi-circular (gauβ-wave-form), or hat-shaped profile elements.

18. The apparatus according to claim 10, wherein the first and second sets of conveyor belts are arranged in a shape of a V.

19. The apparatus according to claim 10, wherein the distance between the first and second sets of conveyor belts that decreases in the feed direction is measured in a direction orthogonal to the feed direction, such that the distance between the first and second sets of conveyor belts decreases as the multilayer stack moves in the feed direction.

* * * * *